(12) United States Patent
Hwang et al.

(10) Patent No.: US 10,006,487 B2
(45) Date of Patent: Jun. 26, 2018

(54) SENSOR ASSEMBLY FOR MONITORING A LINEAR MOTION TRANSMISSION DEVICE INCLUDING A TEMPERATURE SENSOR AND A VIBRATION SENSOR COMBINED IN A SINGLE HOUSING

(71) Applicant: HIWIN TECHNOLOGIES CORP., Taichung (TW)

(72) Inventors: Yih-Chyun Hwang, Taichung (TW); Szu-Wei Yu, Taichung (TW); Min-Hsiu Wu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 206 days.

(21) Appl. No.: 15/052,454

(22) Filed: Feb. 24, 2016

(65) Prior Publication Data

US 2017/0241845 A1    Aug. 24, 2017

(51) Int. Cl.
| | |
|---|---|
| *G01N 19/00* | (2006.01) |
| *F16C 29/00* | (2006.01) |
| *G01H 1/00* | (2006.01) |
| *G01K 1/14* | (2006.01) |
| *G01K 13/06* | (2006.01) |

(52) U.S. Cl.
CPC .............. *F16C 29/00* (2013.01); *G01H 1/00* (2013.01); *G01K 1/14* (2013.01); *G01K 13/06* (2013.01)

(58) Field of Classification Search
CPC ....... G01M 3/005; G01M 9/008; F16C 29/00; G01H 1/00; G01K 1/14; G01K 13/06; G01R 29/20; G01V 3/38
See application file for complete search history.

(56) References Cited

U.S. PATENT DOCUMENTS

| | | | | |
|---|---|---|---|---|
| 9,182,023 | B2* | 11/2015 | Jiang | F16H 25/2214 |
| 9,194,477 | B2* | 11/2015 | Lee | F16H 57/01 |
| 2015/0147007 | A1* | 5/2015 | Huag | F16H 25/2214 384/8 |
| 2015/0226638 | A1* | 8/2015 | Chu | F16H 57/0497 702/34 |
| 2015/0377719 | A1* | 12/2015 | Tsai | G01K 3/10 374/107 |

* cited by examiner

*Primary Examiner* — Manish S Shah
*Assistant Examiner* — Nigel Plumb
(74) *Attorney, Agent, or Firm* — Wang Law Firm, Inc.

(57) ABSTRACT

A sensor assembly includes: a base with an installation space; an electrical connection member disposed on the base; a sensing unit including at least two physical sensors and one integrated circuit board; and a contact member disposed at one end of the base. The sensor assembly is a combination of the temperature sensor and the vibration sensor, the main physical parameters (including back clearance, collision, thermal displacement and lubrication) regarding the operation of the linear motion transmission device can be calculated based on the temperature signal and vibration signals, without requiring the installation of separate different sensors. Therefore, installation space is reduced. The sensor assembly is directly abutted against the linear motion transmission device to detect the change of various physical values in a most direct manner.

9 Claims, 12 Drawing Sheets

SENSOR ASSEMBLY FOR MONITORING A LINEAR MOTION TRANSMISSION DEVICE INCLUDING A TEMPERATURE SENSOR AND A VIBRATION SENSOR COMBINED IN A SINGLE HOUSING

BACKGROUND

Field of the Invention

The present invention relates to a sensor, and more particularly to a sensor assembly for monitoring a linear motion transmission device.

Related Prior Art

With the development of automation industry, the demand for peripheral products of the automation industry also increases. Various motion transmission apparatuses and guide devices are indispensable to automation process. Motion transmission with high speed and accuracy must be performed by linear actuator.

To ensure accuracy, all physical parameters in the process of motion transmission must be exactly in line with requirements, the static physical parameters (such as back clearance, preload or structure stability) must be ensured before motion transmission, and the dynamic physical parameters (such a vibration, temperature rise and lubricity) must also be strictly controlled in the process of motion transmission. The static physical parameters are usually measured before transmission, and readjusted after transmission or before next transmission. As for the dynamic physical parameters, since the parameters of the dynamic components are difficult to be measured, vibration or temperature rise is usually measured at the peripheral platform at the periphery of the linear motion transmission apparatus, and the lubricity must be measured by additional measuring devices.

To maintain the accuracy of the linear motion transmission apparatus, measurement must be performed before and during operation, and adjustment must be made after operation, which is time consuming and laborsome. Besides, the static physical parameters can only be measured before operation, therefore, a fault condition will be undetectable if there is something wrong with the static physical parameters during the operation. Furthermore, measuring at the peripheral platform is unable to precisely measure the parameters of the linear motion transmission apparatus. Moreover, the measuring device for measuring the physical parameters usually has a single function only, therefore, the measuring of multiple parameters requires the use of different measuring devices, which would increase the size of the linear motion transmission apparatus.

The present invention has arisen to mitigate and/or obviate the afore-described disadvantages.

SUMMARY

The present invention is aimed at providing a sensor assembly which solves the problem that a conventional sensor only has a single function.

Therefore, a sensor assembly in accordance with the present invention is assembled on a linear motion transmission device, and comprises:
a base with an installation space;
an electrical connection member disposed on the base, wherein the electrical connection member has one end inserted in the base and another end exposed out of the base;
a sensing unit including at least two types of physical sensors and at least one integrated circuit board which is electrically connected to the two types of physical sensors, the sensing unit is disposed on the base and in electrical contact with the electrical connection member; and
a contact member being used to resist environmental interference, and disposed at one end of the base.

The sensor assembly of the present invention is a combination of the temperature sensor and the vibration sensor, the main physical parameters (including back clearance, collision, thermal displacement and lubrication) regarding the operation of the linear motion transmission device can be calculated based on the temperature signal and vibration signals, without requiring the installation of separate different sensors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Referring to FIGS. 1-6, a sensor assembly A in accordance with the preferred embodiment of the present invention comprises: a base 10, an electrical connection member 20 which serves as an electrical connection member, a sensing unit 30, a contact member 40, and a cover 50.

The base 10 is a hollow structure with an installation space 11.

The electrical connection member 20 is disposed on the base 10, and has one end inserted in the base 10 and another end exposed out of the base 10.

The sensing unit 30 includes at least two types of physical sensors and an integrated circuit board 33. The two types of physical sensors include temperature sensor, vibration sensor, magnetic flux sensor or distance sensor. In this embodiment, the sensing unit 30 includes a temperature sensor 31 and a vibration sensor 32 which are electrically connected to the integrated circuit board 33. The sensing unit 30 is disposed on the base 10 and in electrical contact with the electrical connection member 20.

The contact member 40 is used to resist environmental interference, and includes an engaging groove 41 formed on one side thereof and an annular groove 42 on another opposite side thereof. The contact member 40 is disposed at one end of the base 10 with the engaging groove 41 located toward the temperature sensor 31, and the temperature sensor 31 is engaged with the engaging groove 41. The contact member 40 in this embodiment is an insulation structure.

The cover 50 is fixed to the base 10.

Figure 1:
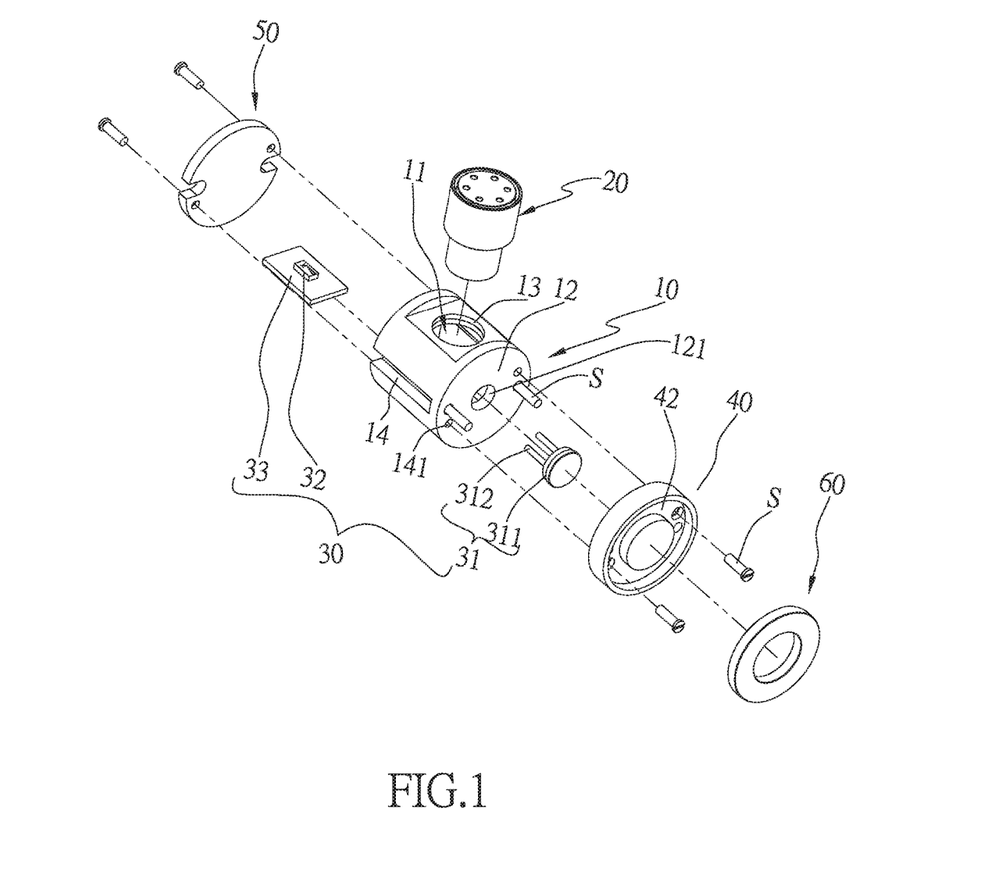
FIG. 1 is an exploded view of a sensor assembly in accordance with a preferred embodiment of the present invention.
Figure 2:
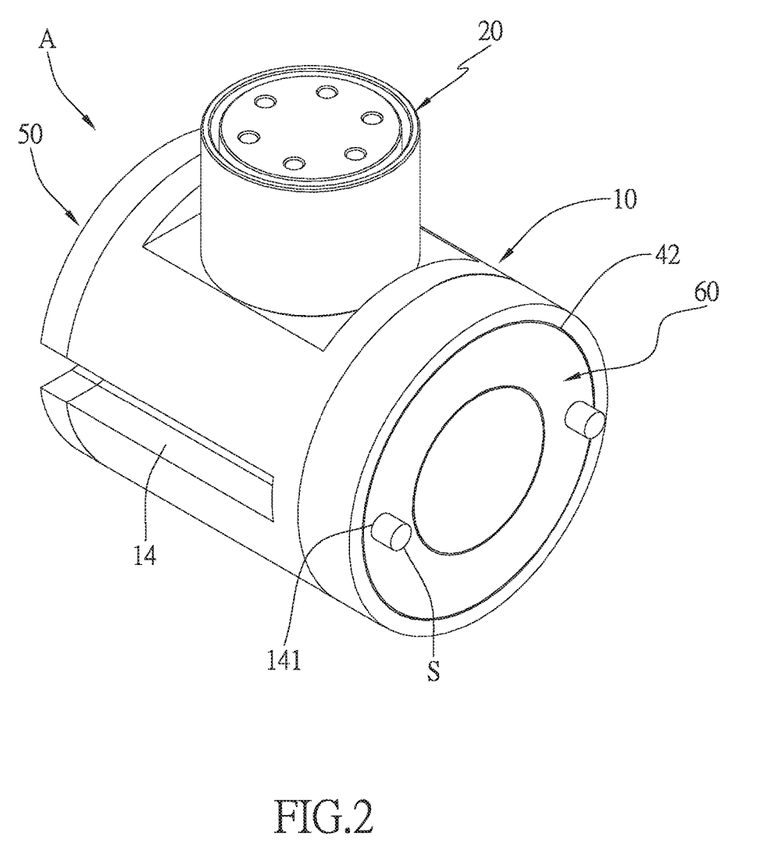
FIG. 2 is an assembly view of the sensor assembly in accordance with the preferred embodiment of the present invention.
Figure 3:
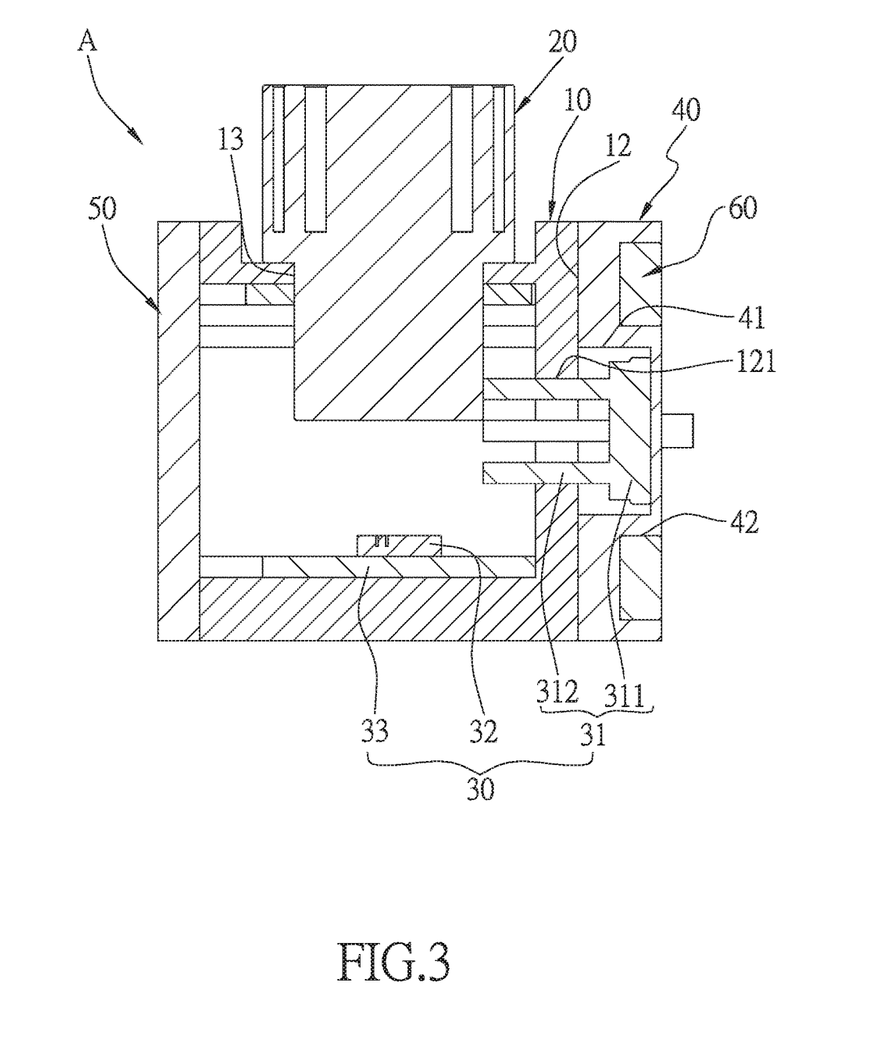
FIG. 3 is a cross sectional view of the sensor assembly in accordance with the preferred embodiment of the present invention.

The form of the base 10 includes, but not limited to, the embodiment shown in FIGS. 1-3, wherein the base 10 is a hollow cylindrical structure formed with the installation space 11. One end of the base 10 is completely open, and another opposite end of the base 10 is an end surface 12. At the center of the end surface 12 is formed a central hole 121. Between the two ends of the base 10 is formed a through hole 13 which is in communication with the installation space 11. The contact member 40 is abutted against and fixed to the end surface 12 of the base 10 by a plurality of fasteners S. The way of fixing the contact member 40 to the end surface 12 is not limited to this, and can also use an annular magnet 60 which is configured to fit in the annular groove 42 to attract the contact member 40 to the end surface 12 of the base 10. In this embodiment, a plurality of axial grooves 14 are formed on the outer peripheral surface of the base 10, and in each of the axial grooves 14 is formed a connecting hole 141 which penetrates the end surface 12.

In this embodiment, the vibration sensor 32 of the sensing unit 30 is electrically connected and fixed to the integrated circuit board 33, and the integrated circuit board 33 is disposed in the installation space 11. The temperature sensor 31 includes a sensing head 311 connected with a plurality of legs 312. The legs 312 are inserted through the central hole 121 into the installation space 11 of the base 10 and electrically connected to the integrated circuit board 33. The sensing head 311 is disposed on the end surface 12 of the base 10 and located toward the engaging groove 41 of the contact member 40.

Figure 4:
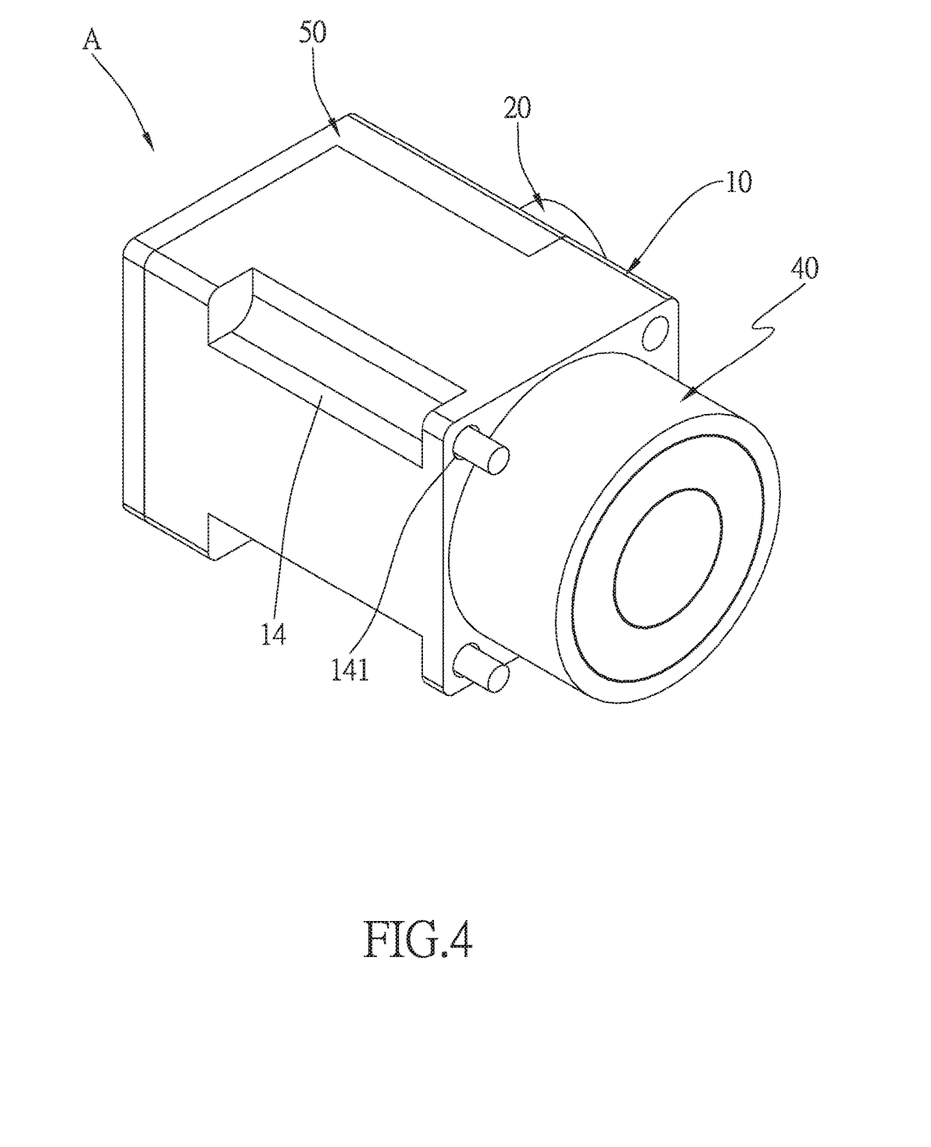
FIG. 4 is an assembly view of a sensor assembly in accordance with another preferred embodiment of the present invention.
Figure 5:
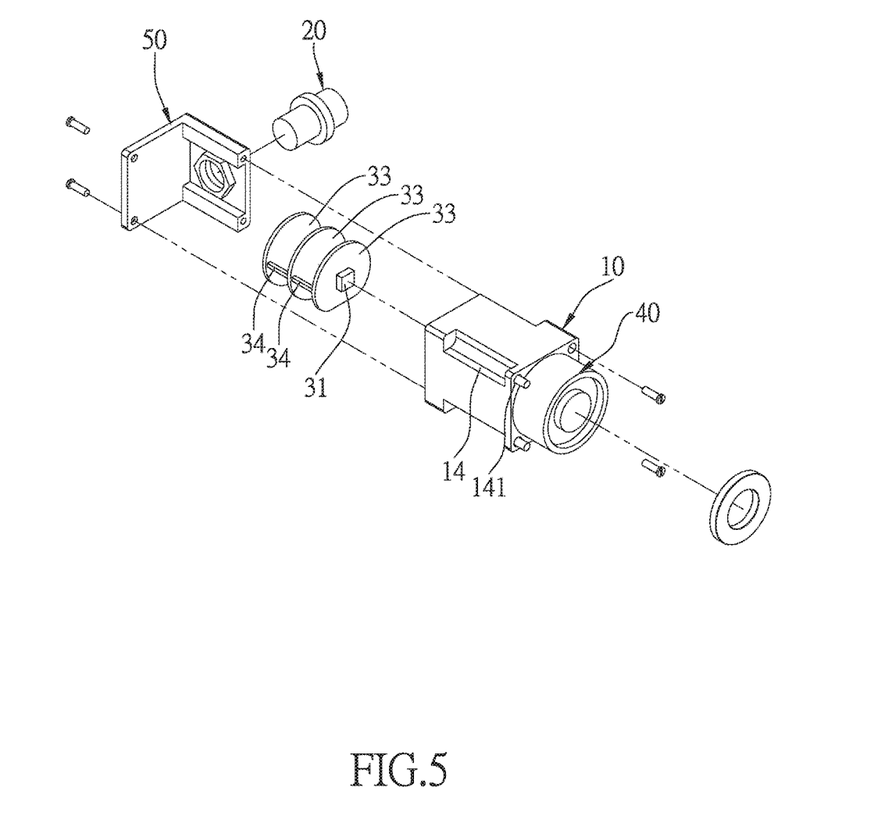
FIG. 5 is an exploded view of the sensor assembly in accordance with the another preferred embodiment of the present invention.
Figure 6:
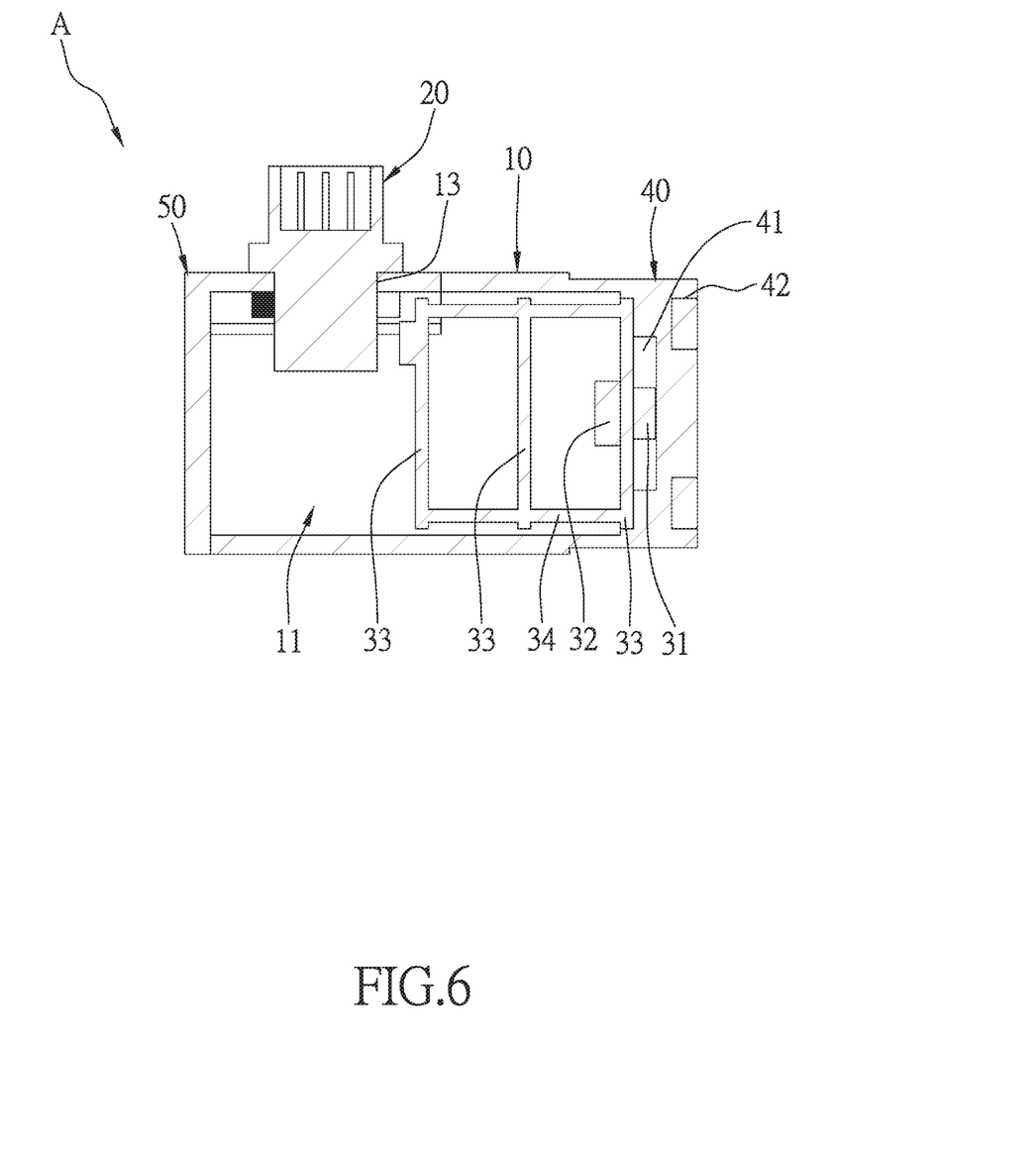
FIG. 6 is a cross sectional view of FIG. 4.

A second preferred embodiment of the present invention is shown in FIGS. 4-6, wherein the base 10 is rectangular-shaped, and the installation space 11 is cylindrical-shaped. In this embodiment, the contact member 40 is integrally formed on the base 10, and the engaging groove 41 is in communication with the installation space 11. The sensing unit 30 includes three integrated circuit boards 33 which are spaced apart in a parallel manner and connected to one another with a plurality of conductive members 34. The temperature sensor 31 and the vibration sensor 32 are disposed on different ones of the integrated circuit boards 33. The sensing unit 30 is disposed in the installation space 11 with the temperature sensor 31 received in the engaging groove 41 of the contact member 40. The cover 50 is an L-shaped member, the through hole 13 is formed in the cover 50, and the electrical connection member 20 is inserted through the through hole 13 of the cover 50 into the installation space 11.

Figure 7:
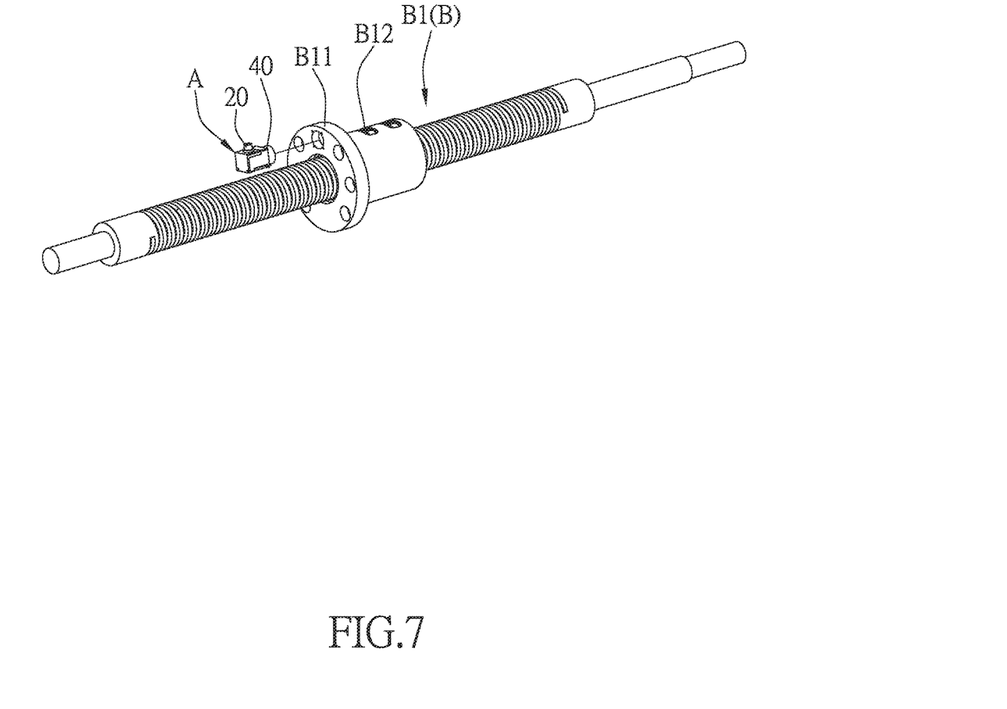
FIG. 7 is an illustrative view showing that the sensor assembly of the present invention is disposed on a linear motion transmission device in the form of a ball screw.
Figure 8:
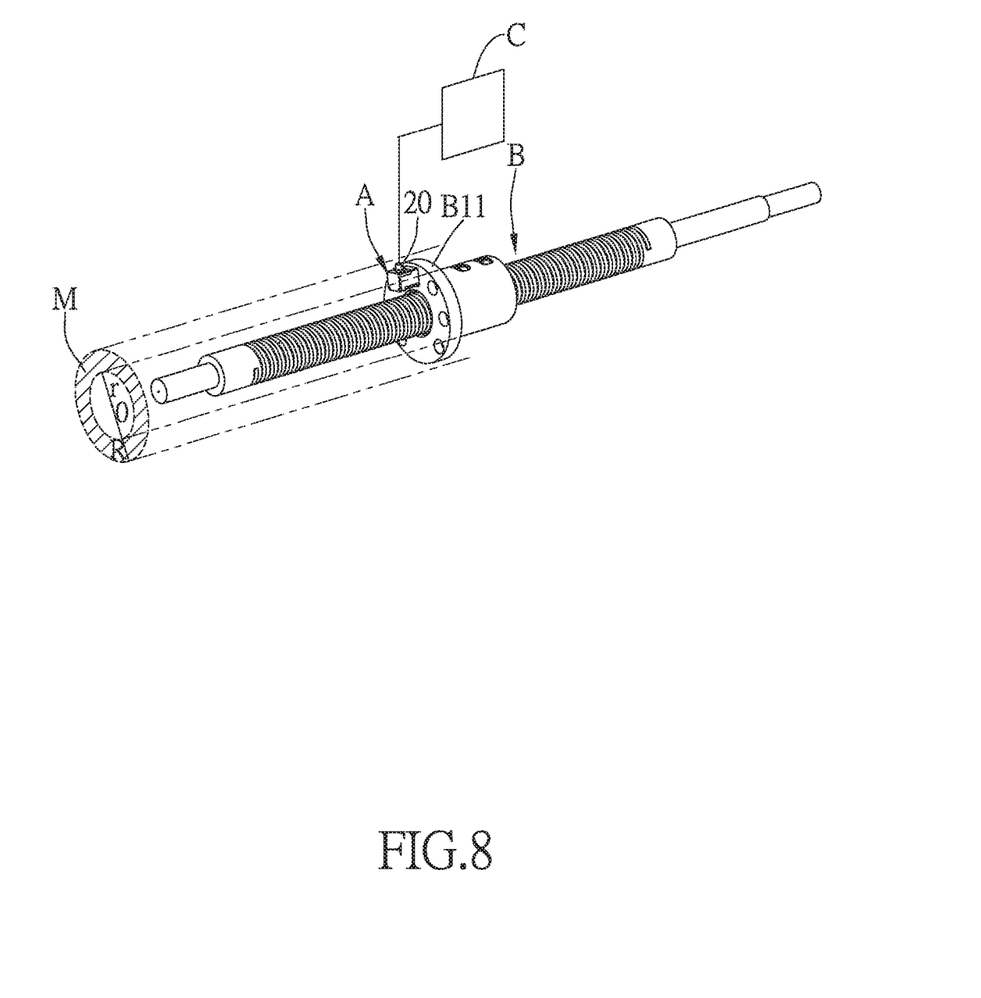
FIG. 8 is an operational view showing that the sensor assembly of the present invention is disposed on a linear motion transmission device in the form of a ball screw.
Figure 9:
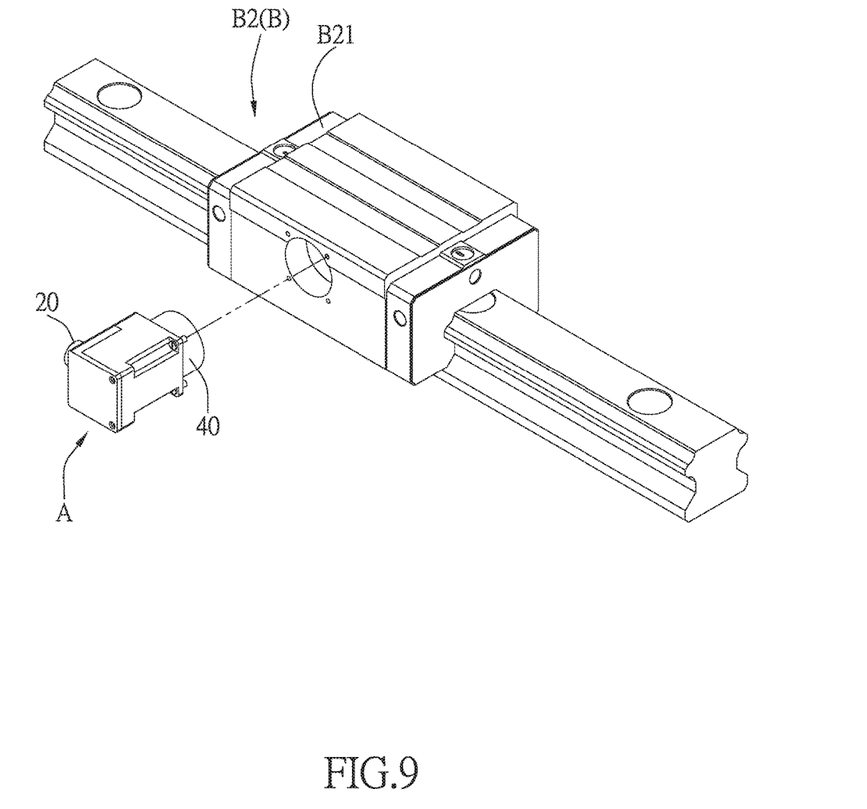
FIG. 9 is an illustrative view showing that the sensor assembly of the present invention is disposed on a linear motion transmission device in the form of a linear guideway.
Figure 10:
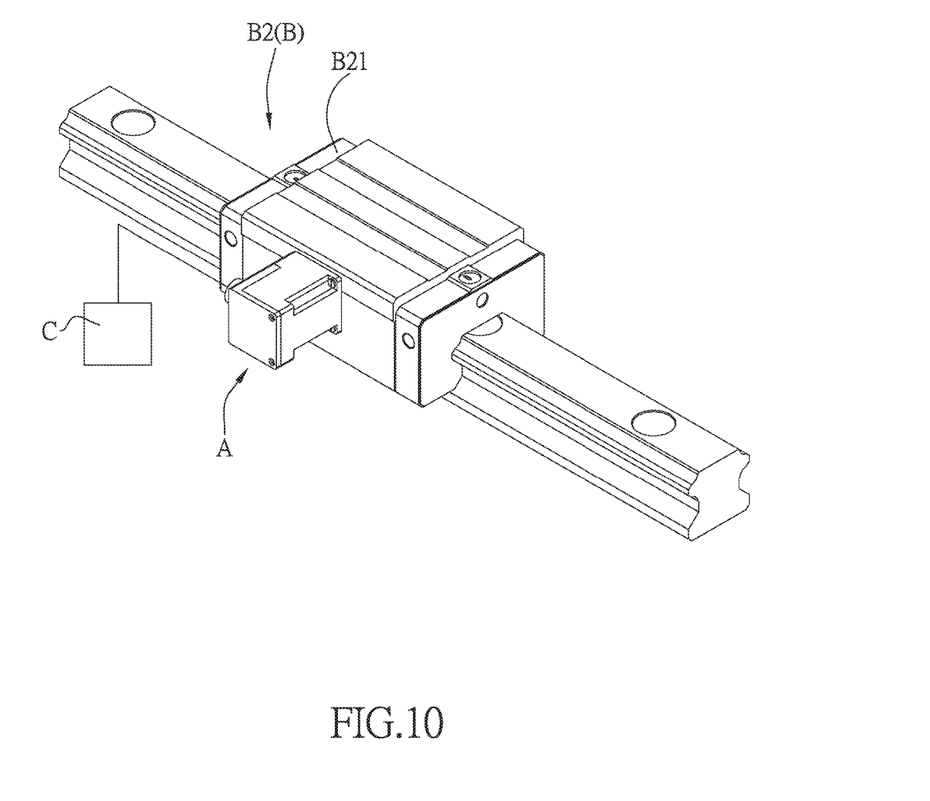
FIG. 10 is an assembly view showing that the sensor assembly of the present invention is disposed on a linear motion transmission device in the form of a linear guideway.
Figure 11:
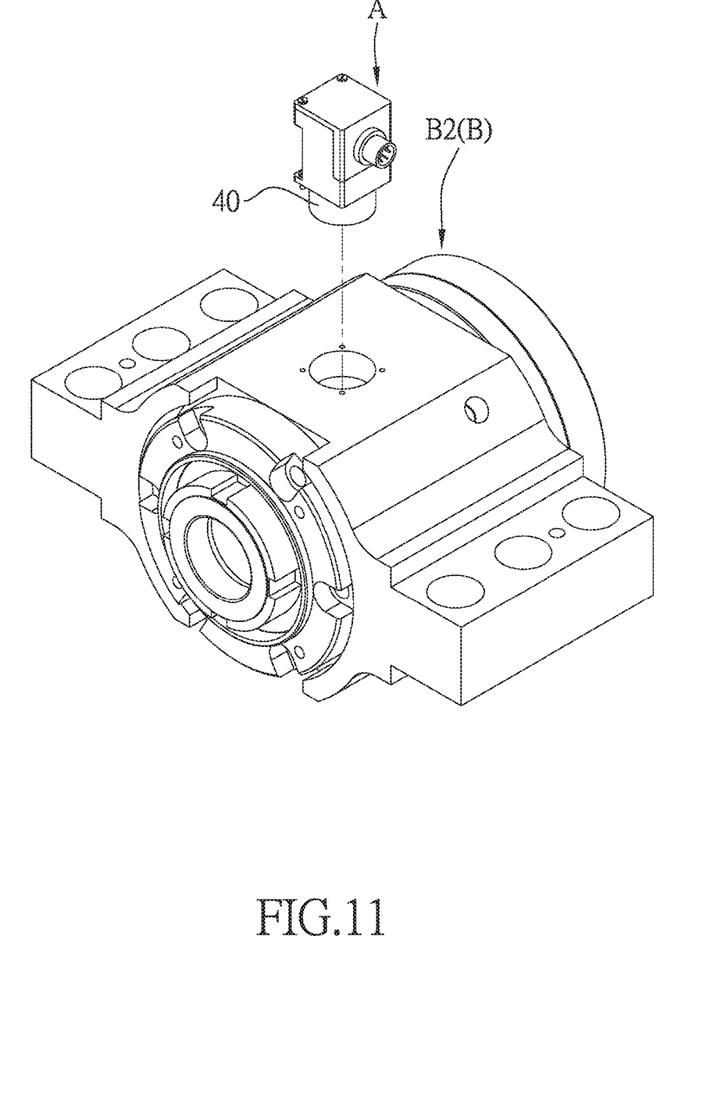
FIG. 11 is an illustrative view showing that the sensor assembly of the present invention is disposed on a linear motion transmission device in the form of a bearing.
Figure 12:
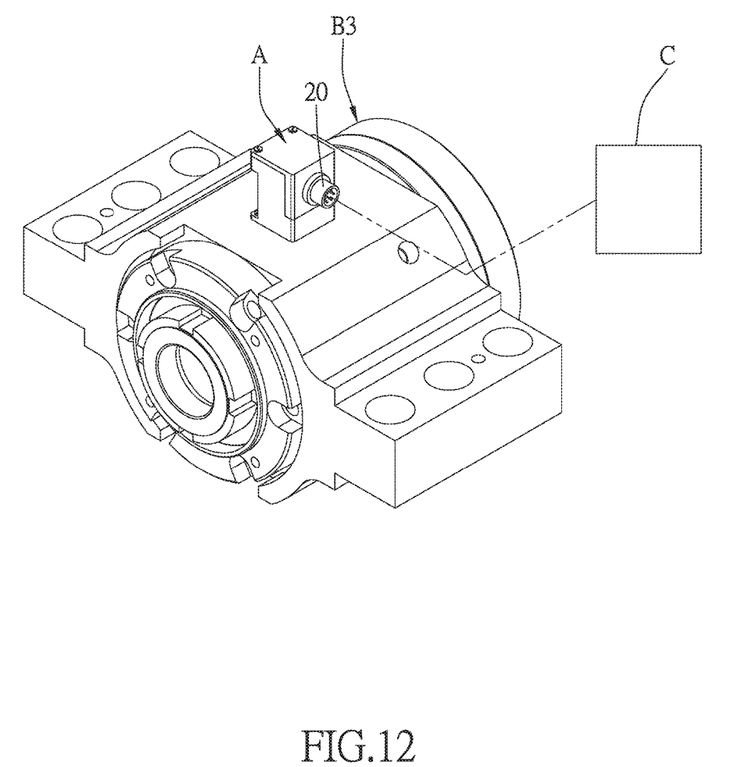
FIG. 12 is an assembly view showing that the sensor assembly of the present invention is disposed on a linear motion transmission device in the form of a bearing.

What mentioned above are the structure relations of the components of the sensor assembly A, and the sensor assembly A is assembled on a linear motion transmission device B to form a linear motion transmission device with sensors, as shown in FIGS. 7-12. The sensor assembly A is assembled in such manner that the contact member 40 is abutted against the linear motion transmission device B. The linear motion transmission device B shown in FIGS. 7 and 8 is a ball screw B1, and the sensor assembly A has the contact member 40 abutted against the nut B11 of the ball screw B1. As shown in FIGS. 9 and 10, the linear motion transmission device B is a linear guideway B2, and the sensor assembly A has the contact member 40 abutted against the slide block B21 of the linear guideway B2. As shown in FIGS. 11 and 12, the linear motion transmission device B is a bearing B3, and the sensor assembly A has the contact member 40 abutted against the bearing B3.

Sine the sensor assembly A of the present invention is directly disposed on the linear motion transmission device B, it can accurately detect the change of physical parameters during the operation of the linear motion transmission device B. The present invention can further comprise a calculation unit C which is electrically connected to the electrical connection member 20 to obtain the data detected by the sensing unit 30. The calculation unit C then performs calculation by using the obtained data, and generates a warning signal when abnormal values are found. With the calculation unit C accessing the detected data and performing calculation, the desired monitoring values can be obtained.

Since the sensing unit 30 of the sensor assembly A of the present invention comprises the temperature sensor 31 and the vibration sensor 32, the main operation parameters or values of the linear motion transmission devices B can be detected and calculated as follows:

Instantaneous change in the back clearance can be obtained by using the calculation unit C to continuously pick up the vibration signals of the vibration sensor 32, and by making use of feature order tracking method. Therefore, the present invention is capable of instantly detecting the back clearance during the operation of the linear motion transmission device B, and sending out a warning signal when an abnormal value of the back clearance is found, so that the back clearance can be readjusted immediately, and a precise monitoring of the linear motion transmission device is achieved.

The vibration value can be detected timely by using the calculation unit C to continuously pick up the vibration signals of the sensing unit 30, and by making use of limit value analysis. Therefore, the present invention is capable of instantly detecting the vibration value during the operation of the linear motion transmission device B, and sending out a warning signal when an abnormal vibration value is found, so that anomalies can be eliminated in time, and a precise monitoring of the linear motion transmission device is achieved.

The thermal displacement can be calculated timely by using algorithm and by using the calculation unit C to continuously pick up the temperature signals of the temperature sensor 31 of the sensing unit 30. Therefore, the present invention is capable of timely detecting temperature rise during the operation of the linear motion transmission device B, and sending out a warning signal when an abnormal temperature rise value is found, so that anomalies can be eliminated in time, and a precise monitoring of the linear motion transmission device is achieved.

The amount of oil can be calculated and detected by using algorithm and by using the calculation unit C to continuously pick up the temperature signals of the temperature sensor 31 of the sensing unit 30. Therefore, the present invention is capable of monitoring the level of lubricating oil during the operation of the linear motion transmission device B, so that when a low level of oil is found, the oiling machine can be started to add oil to the normal level.

The sensor assembly A of the present invention is able to precisely and directly detect various physical parameters during the operation of the linear motion transmission device B since it is directly disposed on the linear motion transmission device B.

Besides, the sensor assembly A of the present invention is a combination of the temperature sensor 31 and the vibration sensor 32, the main physical parameters (including back clearance, collision, thermal displacement and lubrication) regarding the operation of the linear motion transmission device B can be calculated based on the temperature signal and vibration signals, without requiring the installation of separate different sensors. Therefore, installation space is reduced. Of course, the types and number of the sensors of the present invention are not limited by the embodiments described above.

Through circuit integration, the sensor assembly A of the present invention is able to continuously monitor the desired data during operation, without having to stopping the operation of the linear motion transmission device to run a rest, thus improving the production of the linear motion transmission device.

The sensor assembly A of the present invention is further provided with the contact member 40 on the base 10, and the temperature sensor 31 is located corresponding to the contact member 40. Therefore, when the sensor assembly A is assembled, the contact member 40 can be abutted against the linear motion transmission device B directly to detect the temperature change in a most direct manner, so as to reduce detection error. With the arrangement of the contact member 40, the present invention can be assembled in the simplest way and is capable of obtaining the most accurate result.

In order to make it easier for installation of the sensor assembly A, the plurality of axial grooves 14 are formed on the outer peripheral surface of the base 10, and in each of the axial grooves 14 is formed the connecting hole 141 which penetrates the end surface 12, so that fasteners S can be inserted through the connecting holes 141 to fix the base 10 to the linear transmission device B, making the assembling convenient.

To improve the sensing accuracy of the sensor assembly A, the position of the sensor assembly A can further be restricted. For example, as shown in FIGS. 7 and 8, when the sensor assembly A is installed on the nut B11 of the ball screw B1, the nut B11 is provided with a plurality of circulation members B12 which are the sources of signal for generating temperature and vibration signals since the balls of the ball screw B1 roll in the circulation members B12. Suppose that a center point of a cross section of the nut B11 is defined as a center O of a signal source circle, and the furthest distance between a furthest point of the circulation members B12 and the center is defined as a signal-source radius r of the signal source circle. There is a signal sensitive area M around the signal source circle, the signal sensitive area M is defined by a signal-sensitive radius R from the center O, the signal-sensitive radius R is larger than the signal-source radius r, and the difference between the signal-sensitive radius R and the signal-source radius r is less than 10 mm. Assembling the sensor assembly A in the signal sensitive area M can obtain the most accurate source of signal, which consequently ensures the most accurate monitoring.

While we have shown and described various embodiments in accordance with the present invention, it is clear to those skilled in the art that further embodiments may be made without departing from the scope of the present invention.

What is claimed is:

1. A sensor assembly being assembled on a linear motion transmission device, and comprising:
   a base with an installation space;
   an electrical connection member disposed on the base, wherein the electrical connection member has one end inserted in the base and another end exposed out of the base;
   a sensing unit including at least two types of physical sensors and at least one integrated circuit board which is electrically connected to the two types of physical sensors, the sensing unit is disposed on the base and in electrical contact with the electrical connection member; and
   a contact member being used to resist environmental interference, and disposed at one end of the base;
   wherein an engaging groove is formed on one side of the contact member, the contact member is disposed on the base with the engaging groove located toward the physical sensors, the physical sensors are engaged with the engaging groove, and the contact member is an insulation member.

2. The sensor assembly as claimed in claim 1, wherein the physical sensors include temperature sensor, vibration sensor, magnetic flux sensor or distance sensor.

3. The sensor assembly as claimed in claim 1, wherein the at least two types of physical sensors include a temperature sensor and a vibration sensor.

4. The sensor assembly as claimed in claim 1, wherein one of the at least two types of physical sensors is a temperature sensor, the base is a hollow cylindrical structure formed with the installation space, one end of the base is open, another opposite end of the base is an end surface, at a center of the end surface is formed a central hole, a through hole is formed between the two ends of the base and in communication with the installation space, the temperature sensor includes a sensing head connected with a plurality of legs, the legs are inserted through the central hole into the installation space of the base and electrically connected to the integrated circuit board, an engaging groove is formed on one side of the contact member, the sensing head is disposed on the end surface of the base and located toward the engaging groove of the contact member, the contact member is abutted against the end surface of the base, and a cover is fixed at the open end of the base.

5. The sensor assembly as claimed in claim 1, wherein the contact member is fixed to the end surface of the base by a plurality of fasteners.

6. The sensor assembly as claimed in claim 1, wherein an engaging groove is formed on one side of the contact member, an annular groove is formed on another side of the contact member, and an annular magnet is configured to fit in the annular groove to attract the contact member to the base.

7. The sensor assembly as claimed in claim 1, wherein the at least two types of physical sensors include a temperature sensor and a vibration sensor, an engaging groove is formed on one side of the contact member, the base is rectangular-shaped, the installation space is cylindrical-shaped, the contact member is integrally formed on the base, the engaging groove is in communication with the installation space, the sensing unit includes a plurality of integrated circuit boards which are spaced apart in a parallel manner and connected to one another with a plurality of conductive members, the temperature sensor and the vibration sensor are disposed on different ones of the integrated circuit boards, the sensing unit is disposed in the installation space with the temperature sensor received in the engaging groove of the contact member, an L-shaped cover is formed with a through hole, and the electrical connection member is inserted through the through hole of the cover and into the installation space.

8. The sensor assembly as claimed in claim 4, wherein a plurality of axial grooves are formed on an outer peripheral surface of the base, and in each of the axial grooves is formed a connecting hole which penetrates the end surface.

9. The sensor assembly as claimed in claim 1, wherein the contact member is abutted against the linear motion transmission device, the linear motion transmission device is a ball screw, a linear guideway or a bearing, the sensor assembly is mounted on a nut of the ball screw, the nut is provided with a plurality of circulation members, a center point of a cross section of the nut is defined as a center of a signal source circle, the furthest distance between a furthest point of the circulation members and the center is defined as a signal-source radius of the signal source circle, there is a signal sensitive area around the signal source circle, the signal sensitive area is defined by a signal-sensitive radius from the center, the signal-sensitive radius is larger than the signal-source radius, and a difference between the signal-sensitive radius and the signal-source radius is less than 10 mm.

* * * * *